United States Patent
Dino et al.

(10) Patent No.: US 9,534,162 B2
(45) Date of Patent: *Jan. 3, 2017

(54) ORGANOCLAY COMPOSITIONS FOR DRILLING FLUIDS USEFUL TO PROVIDE SUBSTANTIALLY CONSTANT RHEOLOGY PROFILES TO SUCH FLUIDS OVER A WIDE TEMPERATURE RANGE

(71) Applicant: Elementis Specialties, Inc., East Windsor, NJ (US)

(72) Inventors: David Dino, Cranbury, NJ (US); Wouter Ijdo, Yardley, PA (US); Jeffrey Thompson, Hightstown, NJ (US); Kamal Said Kamal Elsayed, Plainsboro, NJ (US)

(73) Assignee: Elementis Specialties, Inc., East Windsor, NJ (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/329,289

(22) Filed: Jul. 11, 2014

(65) Prior Publication Data

US 2016/0009978 A1  Jan. 14, 2016

(51) Int. Cl.
 *C09K 8/32* (2006.01)
(52) U.S. Cl.
 CPC ..................... *C09K 8/32* (2013.01)
(58) Field of Classification Search
 CPC ...................................... C09K 8/32
 USPC ......................................... 507/129
 See application file for complete search history.

(56) References Cited

U.S. PATENT DOCUMENTS

| | | |
|---|---|---|
| 4,024,189 A | 5/1977 | Davis |
| 4,371,469 A | 2/1983 | Foglia et al. |
| 4,683,336 A | 7/1987 | Blackhurst |
| 4,994,620 A | 2/1991 | Fong et al. |
| 5,112,519 A | 5/1992 | Giacobbe et al. |
| 5,634,969 A | 6/1997 | Cody et al. |
| 5,677,473 A | 10/1997 | Tomifuji et al. |
| 5,739,087 A | 4/1998 | Dennis |
| 5,849,960 A | 12/1998 | Singleton et al. |
| 6,008,181 A | 12/1999 | Cripe et al. |
| 6,020,303 A | 2/2000 | Cripe et al. |
| 6,150,322 A | 11/2000 | Singleton et al. |
| 6,335,312 B1 | 1/2002 | Coffindaffer et al. |
| 6,462,096 B1 * | 10/2002 | Dino ............... C01B 33/44 501/146 |
| 6,946,567 B2 | 9/2005 | Zhang et al. |
| 7,098,353 B2 | 8/2006 | Zhang et al. |
| 7,148,375 B2 | 12/2006 | Edwards et al. |
| 7,342,136 B2 | 3/2008 | Kenneally et al. |
| 7,462,730 B2 | 12/2008 | Raney et al. |
| 7,781,390 B2 | 8/2010 | Singleton et al. |
| 2004/0042988 A1 | 3/2004 | Raney et al. |
| 2011/0263884 A1 | 10/2011 | Ngo et al. |
| 2011/0275844 A1 | 11/2011 | Ngo et al. |

OTHER PUBLICATIONS

Dailey Jr., et al., Conversion of Methyl Oleate to Branched-Chain Hydroxy Fatty Acid Derivatives, J. Am Oil Chem Soc (2009) 86, pp. 1101-1114.
D.V. Kinsman, Isostearic and Other Branched Acids, J. Am. Oil Chemists' Soc., vol. 56, Nov. 1979, pp. 823-827.
Ngo, et al., Zeolite-Catalyzed Isomerization of Oleic Acid to Branched-Chain Isomers, Eur. J. Lipid Sci, Technol. 108, (2007), pp. 214-224.
Cason et al., Branched-Chain Fatty Acids XII. Preparation of Branched and Normal Acids for Use in the Study of Melting Points of Binary Mixtures, The Chemical Laboratory of the University of California, Aug. 2, 1949, pp. 139-147.
Svensson et al., The Relationship Between the Structure of Monoalkyl Branched Saturated Fatty Acids and Some Physical Properties, The American Oil Chemists' Society, Lipids, vol. 28., No. 10, (1993), pp. 899-902.
Hansen et al., The Branched-Chain Fatty Acids of Butterfat, Fats Research Laboratory, Department of Scientific and Industrial Research, Wellington, NZ, vol. 50, May 16, 1951, pp. 207-210.
Biermann et al., Synthesis of Alkyl-Branched Fatty Acids, Eur. J. Lipid Sci., Technol., (2008), 110, pp. 805-811.
Sydow, Erik Von, A Microscopic Investigation of Binary Systems of Long Normal and Iso-Chain Carboxylic Acids, Acta Chemica Scandinavica 8, No. 9, 1954, pp. 1513-1518.
Zhang et al., New Process for the Production of Branched-Chain Fatty Acids, Journal of Surfactants and Detergents, vol. 7, No. 3, Jul. 2004, pp. 211-215.
Ngo et al., Process and Cost Modeling of Saturated Branched-Chain Fatty Acid Isomer Production, Ind. Eng. Chem. Res., (2012), 51, pp. 12041-12045.
Ngo et al., Synthesis and Physical Properties of Isostearic Acids and Their Esters, Eur. J. Lipid Sci. Technol., (2011), 113, pp. 180-188.

* cited by examiner

*Primary Examiner* — Frances Tischler
(74) *Attorney, Agent, or Firm* — Morgan, Lewis & Bockius LLP

(57) ABSTRACT

A method of providing a substantially constant rheological profile of an oil-based drilling fluid over a temperature range of about 120° F. to about 40° F., comprising adding drilling fluid additive to the drilling fluid, wherein the drilling fluid additive comprises an organoclay composition comprising: organoclay compositions where a phyllosilicate clay is exchanged with quaternary ammonium ions having a formula of $[NR^1R^2R^3R^4]^+$ wherein at least one of $R^1$, $R^2$ and $R^3$ is a mixture of branched alkyl groups.

20 Claims, No Drawings

ORGANOCLAY COMPOSITIONS FOR DRILLING FLUIDS USEFUL TO PROVIDE SUBSTANTIALLY CONSTANT RHEOLOGY PROFILES TO SUCH FLUIDS OVER A WIDE TEMPERATURE RANGE

FIELD OF THE INVENTION

The present invention relates to a method to provide a drilling fluid additive including an organoclay composition wherein a phyllosilicate clay is exchanged with a quaternary ammonium ion having one or more branched alkyl substituents.

BACKGROUND OF THE INVENTION

Drilling fluids have been used since the very beginning of oil well drilling operations in the United States and drilling fluids and their chemistry are an important area for scientific and chemical investigations. Certain uses and desired properties of drilling fluids are reviewed in U.S. Patent Application 2004/0110642 and 2009/0227478 and U.S. Pat. Nos. 7,345,010, 6,339,048 and 6,462,096, issued to the assignee of this application, the entire disclosures of which are incorporated herein by reference.

Nevertheless, the demands of the oil-well drilling environment require increasing improvements in rheology control over broad temperature ranges. This becomes particularly true, for example, as the search for new sources of oil involves greater need to explore in deep water areas and to employ horizontal drilling techniques.

SUMMARY OF THE INVENTION

In one embodiment, the present disclosure provides a method to provide a substantially constant rheological profile of an oil-based drilling fluid over a temperature range of about 120° F. to about 40° F. by using an organoclay composition as a drilling fluid additive. The organoclay composition may comprise: a phyllosilicate clay; and quaternary ammonium ions having a formula of $[N-R^1R^2R^3R^4]^+$ wherein one or more of $R^1$, $R^2$ and $R^3$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein when one or more of $R^2$ and $R^3$ are not branched alkyl groups, one or more of $R^2$ and $R^3$ are a first linear alkyl group having 1 to 22 total carbon atoms. $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In one embodiment, the present disclosure provides for an organoclay composition comprising a mixture of (i) a phyllosilicate clay and quaternary ammonium ions having a formula of $[NR^1R^2R^3R^4]^+$ and (ii) a phyllosilicate clay and quaternary ammonium ions having a formula of $[NR^8R^9R^{10}R^{11}]^+$. For the organoclay composition comprising a phyllosilicate clay and quaternary ammonium ions having a formula of $[NR^1R^2R^3R^4]^+$, one or more of $R^1$, $R^2$ and $R^3$ is each a mixture of branched alkyl groups each having 12 to 22 total carbon atoms wherein the branched alkyl group has one or more $C_1$ to $C_3$ alkyl groups distributed at different carbon positions along a linear backbone of the branched alkyl group.

For the organoclay composition comprising a phyllosilicate clay and quaternary ammonium ions having a formula of $[NR^8R^9R^{10}R^{11}]^+$, one or more of $R^8$, $R^9$ and $R^{10}$ is each a third linear alkyl group having 12 to 22 total carbon atoms. In embodiments, when one or more of $R^9$ and $R^{10}$ are not the third linear alkyl group then $R^9$ and $R^{10}$ are each a fourth linear alkyl group having 1 to 22 total carbon atoms. $R^{11}$ is selected from a fifth linear alkyl group having 1 to 6 total carbon atoms, an aryl group and mixtures thereof.

DETAILED DESCRIPTION OF THE EMBODIMENTS

The present invention provides for a method of providing a substantially constant rheological profile of an oil-based drilling fluid over a temperature range of about 120° F. to about 40° F. The method includes the steps of adding drilling fluid additive to the drilling fluid, wherein the drilling fluid additive organoclay compositions where a phyllosilicate clay is exchanged with quaternary ammonium ions having a formula of $[NR^1R^2R^3R^4]^+$ wherein at least one of $R^1$, $R^2$ and $R^3$ is a mixture of branched alkyl groups. It has been unexpectedly found that such organoclay compositions exhibit different properties compared to prior art organoclay compositions exchanged with quaternary ammonium ions having a formula of $[NR^aR^bR^cR^d]^+$ where at least one of $R^a$, $R^b$, $R^c$ and $R^d$ is a not a mixture of branched alkyl groups but a single branched alkyl group, such as 12-methyl stearyl, having a branching point located at a single position along the linear backbone of the branched alkyl group.

In each of the embodiments, below "substantially free of quaternary carbon atoms" shall mean that a quaternary carbon atom is not detected by $C^{13}$ NMR.

First Embodiment

In one embodiment, the present disclosure provides a method to provide a substantially constant rheological profile of an oil-based drilling fluid over a temperature range of about 120° F. to about 40° F. by using an organoclay composition as a drilling fluid additive. The organoclay composition may comprise: a phyllosilicate clay; and quaternary ammonium ions having a formula of $[N-R^1R^2R^3R^4]^+$ wherein one or more of $R^1$, $R^2$ and $R^3$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein when one or more of $R^2$ and $R^3$ are not branched alkyl groups, one or more of $R^2$ and $R^3$ are a first linear alkyl group having 1 to 22 total carbon atoms. $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments, the branched alkyl group, of one or more of $R^1$, $R^2$ and $R^3$, has an average number of branches, per branched alkyl group, of at least 0.7. In some other embodiments, the branched alkyl group, of one or more of $R^1$, $R^2$ and $R^3$, has an average number of branches per branched alkyl group ranging from 0.7 to 7. In some other embodiments, the branched alkyl group, of one or more of $R^1$, $R^2$ and $R^3$, has an average number of branches per branched alkyl group ranging from 0.7 to 5. In some other embodiments, the branched alkyl group, of one or more of $R^1$, $R^2$ and $R^3$, has an average number of branches per branched alkyl group ranging from 0.7 to 3. In each such embodiment, a methyl branch is at, least 50% of the branching alkyl groups based on the total number of branches.

In some embodiments, each branched alkyl group, of one or more of $R^1$, $R^2$ and $R^3$, has a distribution of branching points distributed along the linear backbone of the branched alkyl group ranging from a 2 carbon atom position on the linear backbone, counting from a 1 carbon atom position which is bonded to $N^+$, to a $\omega$-2 carbon atom position, where $\omega$ is a terminal carbon atom position on the linear backbone. In such embodiments, a methyl branch is at least 50% of the branching alkyl groups based on the total number of branches.

In some embodiments, the linear backbone, of the branched alkyl group of one or more of $R^1$, $R^2$ and $R^3$, contains less 0.5 atom % of quaternary carbon atoms. In other embodiments, the linear backbone, of the branched alkyl group one or more of $R^1$, $R^2$ and $R^3$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Second Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprising: a phyllosilicate clay; and quaternary ammonium ions having a formula of $[NR^1R^2R^3R^4]^+$ wherein $R^1$ is a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^2$ and $R^3$ are independently selected from the group consisting of: a first linear alkyl group having 1 to 22 total carbon atoms, wherein $R^4$ is selected from the group consisting of: a second linear alkyl group having 1 to 6 carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, one or more of $R^2$ and $R^3$ are each the first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments, the $R^1$ branched alkyl group has an average number of branches, per branched alkyl group, of at least 0.7. In some other embodiments, the $R^1$ branched alkyl group has an average number of branches per branched alkyl group ranging from 0.7 to 7. In some other embodiments, the $R^1$ branched alkyl group has an average number of branches per branched alkyl group ranging from 0.7 to 5. In some other embodiments, the $R^1$ branched alkyl group has an average number of branches per branched alkyl group ranging from 0.7 to 3. In each such embodiment, a methyl branch is at least 50% of the branching alkyl groups based on the total number of branches.

In some embodiments, the $R^1$ branched alkyl group has a distribution of branching points distributed along the linear backbone of the branched alkyl group ranging from a 2 carbon atom position on the linear backbone, counting from a 1 carbon atom position which is bonded to $N^+$, to a $\omega$-2 carbon atom position, where $\omega$ is a terminal carbon atom position on the linear backbone. In such embodiments, a methyl branch is at least 50% of the branching alkyl groups based on the total number of branches.

In some embodiments, the linear backbone, of the $R^1$ branched alkyl group, contains less 0.5 atom % of quaternary carbon atoms. In other embodiments, the linear backbone, of the $R^1$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Third Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises a phyllosilicate clay; and quaternary ammonium ions having a formula of $[NR^1R^2R^3R^4]^+$ wherein $R^1$ and $R^2$ are a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^3$ is a first linear alkyl group having 1 to 22 total carbon atoms, $R^4$ is selected from the group consisting of: a second linear alkyl group having 1 to 6 total carbon atoms, an aryl group, and combinations thereof. In some embodiments, each branched alkyl group has 12 to 18 total carbon atoms. In some embodiments, each branched alkyl group has 14 to 18 total carbon atoms. In some embodiments, $R^3$ is a first linear alkyl group having 12 to 22 total carbon atoms; 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, $R^3$ is methyl and $R^4$ is benzyl. In some other embodiments, $R^3$ and $R^4$ are each methyl.

In some embodiments, the branched alkyl group, of $R^1$ and $R^2$, has an average number of branches, per branched alkyl group, of at least 0.7. In some other embodiments, the branched alkyl group, of $R^1$ and $R^2$, has an average number of branches per branched alkyl group ranging from 0.7 to 7. In some other embodiments, the branched alkyl group, of $R^1$ and $R^2$, has an average number of branches per branched alkyl group ranging from 0.7 to 5. In some other embodiments, the branched alkyl group, of $R^1$ and $R^2$, has an average number of branches per branched alkyl group ranging from 0.7 to 3. In each such embodiment, a methyl branch is at least 50% of the branching alkyl groups based on the total number of branches.

In some embodiments, each $R^1$ and $R^2$ branched alkyl group has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of each $R^1$ and $R^2$ branched alkyl group, contains less 0.5 atom % of quaternary carbon atoms. In other embodiments, the linear backbone, of each $R^1$ and $R^2$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Fourth Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises a phyllosilicate clay; and quaternary ammonium ions having a formula of $[NR^1R^2R^3R^4]^+$, wherein $R^1$, $R^2$ and $R^3$ are each a mixture of branched alkyl groups, each branched alkyl group having 12 to 22 total carbon atoms, a linear backbone and one or more $C_1$ to $C_3$ branching alkyl groups, wherein the branching alkyl groups are distributed at different carbon positions along the linear backbone of the branched alkyl group; and wherein $R^4$ is selected from the group consisting of: a second linear alkyl group having 1 to 6 carbon atoms, an aryl group, and combinations thereof. In some embodiments, each branched alkyl group has 12 to 18 carbon atoms. In some embodiments, each branched alkyl group has 14 to 18 carbon atoms. In some embodiments, $R^4$ is independently a benzyl group, a methyl group, an ethyl group, a propyl group, a butyl group, a pentyl group or a hexyl group. In some other embodiments, $R^4$ is benzyl. In some other embodiments, $R^4$ is methyl.

In some embodiments, each $R^1$, $R^2$ and $R^3$ branched alkyl group has an average number of branches, per branched alkyl group, of at least 0.7. In some other embodiments, each $R^1$, $R^2$ and $R^3$ branched alkyl group has an average number of branches per branched alkyl group ranging from 0.7 to 7. In some other embodiments, each $R^1$, $R^2$ and $R^3$ branched alkyl group has an average number of branches per branched alkyl group ranging from 0.7 to 5. In some other embodiments, each $R^1$, $R^2$ and $R^3$ branched alkyl group has an average number of branches per branched alkyl group ranging from 0.7 to 3. In each such embodiment, a methyl branch is at least 50% of the branching alkyl groups based on the total number of branches.

In some embodiments, each $R^1$, $R^2$ and $R^3$ branched alkyl group has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of each $R^1$, $R^2$ and $R^3$ branched alkyl group, contains less 0.5 atom % of quaternary carbon atoms. In other embodiments, the linear backbone, of each $R^1$, $R^2$ and $R^3$ branched alkyl group, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Fifth Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises a mixture of (i) a phyllosilicate clay and quaternary ammonium ions having a formula of $[NR^1R^2R^3R^4]^+$ and (ii) a phyllosilicate clay and quaternary ammonium ions having a formula of $[NR^8R^9R^{10}R^{11}]^+$. For the organoclay composition comprising a phyllosilicate clay and quaternary ammonium ions having a formula of $[NR^1R^2R^3R^4]^+$, one or more of $R^1$, $R^2$ and $R^3$ is each a mixture of branched alkyl groups each having 12 to 22 total carbon atoms wherein the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. In embodiments, when one or more of $R^2$ and $R^3$ is not a branched alkyl group, $R^2$ and $R^3$ are each a first linear alkyl group having 1 to 22 total carbon atoms. $R^4$ is selected from the group consisting of a second linear alkyl group having 1 to 6 carbon atoms, an aryl group and combinations thereof. In some embodiments, one or more of $R^2$ and $R^3$ are each the second linear alkyl group having 12 to 22 total carbon atoms; 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

For the organoclay composition comprising a phyllosilicate clay and quaternary ammonium ions having a formula of $[NR^8R^9R^{10}R^{11}]^+$, one or more of $R^8$, $R^9$ and $R^{10}$ is each a third linear alkyl group having 12 to 22 total carbon atoms. In embodiments, when one or more of $R^9$ and $R^{10}$ are not the third linear alkyl group then $R^9$ and $R^{10}$ are each a fourth linear alkyl group having 1 to 22 total carbon atoms. $R^{11}$ is selected from a fifth linear alkyl group having 1 to 6 total carbon atoms, an aryl group and mixtures thereof. In some embodiments, the third linear alkyl group may have 12 to 18 total carbon atoms or 14 to 18 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, each branched alkyl group, of $[NR^1R^2R^3R^4]^+$, has an average number of branches, per branched alkyl group, of at least 0.7. In some other embodiments, the branched alkyl group, of $[NR^1R^2R^3R^4]^+$, has an average number of branches, per branched alkyl group, ranging from 0.7 to 7. In some other embodiments, the branched alkyl group, of $[NR^1R^2R^3R^4]^+$, has an average number of branches, per branched alkyl group, ranging from 0.7 to 5. In some other embodiments, the branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, each branched alkyl group, of $[NR^1R^2R^3R^4]^+$, has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of each branched alkyl group of $[NR^1R^2R^3R^4]^+$, contains less 0.5 atom % of quaternary carbon atoms. In other embodiments, the linear backbone, of each branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or an anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Sixth Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises comprising a mixture of (i) a phyllosilicate clay and quaternary ammonium ions having a formula of $[NR^1R^2R^3R^4]^+$ wherein $R^1$ is a mixture of branched alkyl groups having 12 to 22 total carbon atoms and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms. In some embodiments of the organoclay composition of an phyllosilicate clay and the quaternary ammonium ions having a formula of $[NR^1R^2R^3R^4]^+$, branched alkyl group of $R^1$ has one or more $C_1$ to $C_3$ alkyl groups distributed at different carbon positions along a linear backbone of the branched alkyl group. In some embodiments, the branched alkyl group, of $[NR^1R^2R^3R^4]^+$, may have 12 to 18 total carbon atoms or 14 to 18 total carbon atoms. In some embodiments, one or more of $R^2$ and $R^3$ are each a first linear alkyl group having 1 to 22 carbon atoms and $R^4$ is selected from: a second linear alkyl group having 1 to 6 total carbon atoms, an aryl group. In some embodiments, one or more of $R^2$ and $R^3$ are each the first linear alkyl group having 12 to 22 total carbon atoms, 1 to 6 total carbon atoms or 7-11 total carbon atoms. In some embodiments, $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments of the organoclay composition of an phyllosilicate clay and the quaternary ammonium ions having a formula of $[NR^8R^9R^{10}R^{11}]^+$, one or more of $R^9$ and $R^{10}$ are each a fourth linear alkyl group having 1 to 22 total carbon atoms. $R^{11}$ is selected from a fifth linear alkyl group having 1 to 6 total carbon atoms, an aryl group and mixtures thereof. In some embodiments, the third linear alkyl group, of $[NR^8R^9R^{10}R^{11}]^+$, may have 12 to 18 total carbon atoms or 14 to 18 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$ branched alkyl group, of $[NR^1R^2R^3R^4]^+$, has an average number of branches, per branched alkyl group, of at least 0.7. In some other embodiments, the $R^1$ branched alkyl group, of $[NR^1R^2R^3R^4]^+$, has an average number of branches, per branched alkyl group, ranging from 0.7 to 7. In some other embodiments, the $R^1$ branched alkyl group, of $[NR^1R^2R^3R^4]^+$, has an average number of branches, per branched alkyl group, ranging from 0.7 to 5. In some other embodiments, the $R^1$ branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$ branched alkyl group, of $[NR^1R^2R^3R^4]^+$, has a distribution of branching points distributed along the linear backbone of the $R^1$ branched alkyl group ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of the $R^1$ branched alkyl group of $[NR^1R^2R^3R^4]^+$, contains less 0.5 atom % of quaternary carbon atoms. In other embodiments, the linear backbone, of the $R^1$ branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Seventh Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises mixture of (i) a phyllosilicate clay and quaternary ammonium ions having a formula of $[NR^1R^2R^3R^4]^+$ wherein $R^1$ and $R^2$ are each a mixture of branched alkyl groups having 12 to 22 total carbon atoms and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms. In some embodiments of the organoclay composition comprising mixture of (i) a phyllosilicate clay and quaternary ammonium ions having a formula of $[NR^1R^2R^3R^4]^+$, the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. $R^3$ is a first linear alkyl group having 1 to 22 total carbon atoms, $R^4$ is selected from a second linear alkyl group having 1 to 6 carbon atoms, an aryl group and mixtures thereof. In some embodiments, $R^3$ is the first linear alkyl group having 12 to 22 total carbon atoms, 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, $R^3$ is methyl and $R^4$ is benzyl. In some other embodiments, $R^3$ and $R^4$ are each methyl.

In some embodiments of the organoclay composition comprising a phyllosilicate clay and quaternary ammonium ions having a formula of $[NR^8R^9R^{10}R^{11}]^+$, the third linear alkyl group may have 12 to 18 total carbon atoms or 14 to 18 total carbon atoms. In some embodiments, one or more of $R^9$ and $R^{10}$ are each a fourth linear alkyl group having 1 to 22 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms. In some embodiments, $R^{11}$ is selected from a fifth linear alkyl group having 1 to 6 total carbon atoms, an aryl group and combinations thereof. In some embodiments, $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$ and $R^2$ branched alkyl groups, of $[NR^1R^2R^3R^4]^+$, has an average number of branches, per branched alkyl group, at least 0.7. In some other embodiments, the $R^1$ and $R^2$ branched alkyl groups, of $[NR^1R^2R^3R^4]^+$, has an average number of branches, per branched alkyl group, ranging from 0.7 to 7. In some other embodiments, the $R^1$ and $R^2$ branched alkyl groups, of $[NR^1R^2R^3R^4]^+$, has an average number of branches, per branched alkyl group, ranging from 0.7 to 5. In some other embodiments, the $R^1$ and $R^2$ branched alkyl groups, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$ and $R^2$ branched alkyl groups, of $[NR^1R^2R^3R^4]^+$, has a distribution of branching points distributed along the linear backbone of the $R^1$ and $R^2$ branched alkyl groups ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of the $R^1$ and $R^2$ branched alkyl groups of $[NR^1R^2R^3R^4]^+$, contains less 0.5 atom % of quaternary carbon atoms. In other embodiments, the linear backbone, of the $R^1$ and $R^2$ branched alkyl groups of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Eighth Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises a mixture of (i) a phyllosilicate clay and quaternary ammonium ions having a formula of $[NR^1R^2R^3R^4]^+$ wherein $R^1$, $R^2$ and $R^3$ are each a mixture of branched alkyl groups having 12 to 22 total carbon atoms and $R^4$ is a second linear alkyl group having 1 to 6 carbon total atoms, an aryl and mixtures thereof and (ii) a phyllosilicate clay and quaternary ammonium ions having a formula of $[NR^8R^9R^{10}R^{11}]^+$ wherein one or more of $R^8$, $R^9$ and $R^{10}$ is each a third linear alkyl group having 12 to 22 total carbon atoms and $R^{11}$ is selected from a fifth linear alkyl group having 1 to 6 total carbon atoms, an aryl and mixtures thereof.

In some embodiments, the branched alkyl group has one or more $C_1$ to $C_3$ alkyl groups distributed at different carbon positions along a linear backbone of the branched alkyl group. In some embodiments, the branched alkyl group may have 12 to 18 total carbon atoms or 14 to 18 total carbon atoms. In some embodiments, the third linear alkyl group may have 12 to 18 total carbon atoms or 14 to 18 total carbon atoms. In some embodiments, $R^4$ is independently a benzyl group, a methyl group, an ethyl group, a propyl group, a butyl group, a pentyl group or a hexyl group. In some other embodiments, $R^4$ is benzyl. In some other embodiments, $R^4$ is methyl.

In some embodiments, one or more of $R^9$ and $R^{10}$ are each a fourth linear alkyl group having 1 to 22 total carbon atoms. In some embodiments, one or more of $R^9$ and $R^{10}$ are each the fourth linear alkyl group having 12 to 22 total carbon atoms; 1 to 6 total carbon atoms or 7-11 total carbon atoms and $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, the $R^1$, $R^2$ and $R^3$ branched alkyl groups, of $[NR^1R^2R^3R^4]^+$, has an average number of branches, per branched alkyl group, at least 0.7. In some other embodiments, the $R^1$, $R^2$ and $R^3$ branched alkyl groups, of $[NR^1R^2R^3R^4]^+$, has an average number of branches, per branched alkyl group, ranging from 0.7 to 7. In some other embodiments, the $R^1$, $R^2$ and $R^3$ branched alkyl groups, of $[NR^1R^2R^3R^4]^+$, has an average number of branches, per branched alkyl group, ranging from 0.7 to 5. In some other embodiments, the $R^1$, $R^2$ and $R^3$ branched alkyl groups, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, the $R^1$, $R^2$ and $R^3$ branched alkyl groups, of $[NR^1R^2R^3R^4]^+$, has a distribution of branching points distributed along the linear backbone of the $R^1$, $R^2$ and $R^3$ branched alkyl groups ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of the $R^1$, $R^2$ and $R^3$ branched alkyl groups of $[NR^1R^2R^3R^4]^+$, contains less 0.5 atom % of quaternary carbon atoms. In other embodiments, the linear backbone, of the $R^1$, $R^2$ and $R^3$ branched alkyl groups of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Ninth Embodiment

In one embodiment, the present disclosure provides for a method to provide a substantially constant rheological profile of an oil-based drilling fluid over a temperature range of about 120° F. to about 40° F. by using an organoclay composition as a drilling fluid additive, wherein the organoclay composition comprises a phyllosilicate clay and a mixture of quaternary ammonium ions having formulas of (i) $[NR^1R^2R^3R^4]^+$ wherein one or more of $R^1$, $R^2$ and $R^3$ is each a mixture of branched alkyl groups each having 12 to 22 total carbon atoms; 12 to 18 total carbon atoms or 14 to 18 total carbon atoms and (ii) $[NR^8R^9R^{10}R^{11}]^+$ wherein one or more of $R^8$, $R^9$ and $R^{10}$ is each a third linear alkyl group having 12 to 22 total carbon atoms; 12 to 18 total carbon atoms or 14 to 18 total carbon atoms. In some embodiments, the branched alkyl group has one or more $C_1$ to $C_3$ alkyl groups distributed at different carbon positions along a linear backbone of the branched alkyl group.

In some embodiments of quaternary ammonium ion having formula of (i) $[NR^1R^2R^3R^4]^+$, when one or more of $R^2$ and $R^3$ are not branched alkyl groups, one or more of $R^2$ and $R^3$ are each a first linear alkyl group having 1 to 22 carbon total atoms. $R^4$ is independently selected from a second linear alkyl group having 1 to 22 total carbon atoms, an aryl group and mixtures thereof. In some embodiments, one or more of $R^2$ and $R^3$ are each the first linear alkyl group having 12 to 22 total carbon atoms; 1 to 6 total carbon atoms or 7-11 total carbon atoms; and $R^4$ is independently a benzyl group, a methyl group, an ethyl group, a propyl group, a butyl group, a pentyl group or a hexyl group. In some other embodiments, one or more of $R^2$ and $R^3$ are methyl and $R^4$ is benzyl. In some other embodiments, $R^2$, $R^3$ and $R^4$ are each methyl.

In some embodiments of the quaternary ammonium ion having formula of $[NR^8R^9R^{10}R^{11}]^+$ wherein, $R^8$ is the third linear alkyl group and $R^9$ and $R^{10}$ are each a fourth linear alkyl group having 1 to 22 total carbon atoms, and $R^{11}$ is selected from a fifth linear alkyl group having 1 to 6 total carbon atoms, an aryl group and mixtures thereof. The fourth linear alkyl group may have 12 to 22 total carbon atoms; 1 to 6 total carbon atoms or 7-11 total carbon atoms. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments of the quaternary ammonium ion having formula of $[NR^8R^9R^{10}R^{11}]^+$, $R^8$ and $R^9$ are the third linear alkyl group and $R^{10}$ is a fourth linear alkyl group having 1 to 22 total carbon atoms, and $R^{11}$ is selected from a fifth linear alkyl group having 1 to 6 total carbon atoms, an aryl group and mixtures thereof. The fourth linear alkyl group may have 12 to 22 total carbon atoms; 1 to 6 total carbon atoms or 7-11 total carbon atoms. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments of the quaternary ammonium ion having formula of $[NR^8R^9R^{10}R^{11}]^+$, $R^8$, $R^9$ and $R^{10}$ are the third linear alkyl group and $R^{11}$ is selected from a fifth linear alkyl group having 1 to 6 total carbon atoms, an aryl group and mixtures thereof. $R^{11}$ is independently a benzyl group, a methyl group, an ethyl group, a propyl group, a butyl group, a pentyl group or a hexyl group. In some other embodiments, one or more of $R^9$ and $R^{10}$ are methyl and $R^{11}$ is benzyl. In some other embodiments, $R^9$, $R^{10}$ and $R^{11}$ are each methyl.

In some embodiments, each branched alkyl group, of $[NR^1R^2R^3R^4]^+$, has an average number of branches, per branched alkyl group, of at least 0.7. In some other embodiments, the branched alkyl group, of $[NR^1R^2R^3R^4]^+$, has an average number of branches, per branched alkyl group, ranging from 0.7 to 7. In some other embodiments, the branched alkyl group, of $[NR^1R^2R^3R^4]^+$, has an average number of branches, per branched alkyl group, ranging from 0.7 to 5. In some other embodiments, the branched alkyl group, of $[NR^1R^2R^3R^4]^+$, has an average number of branches, per branched alkyl group, ranging from 0.7 to 3. In each such embodiment, a methyl branch is at least 50% of the branching alkyl groups based on the total number of branches.

In some embodiments, each branched alkyl group, of $[NR^1R^2R^3R^4]^+$, has a distribution of branching points distributed along the linear backbone of the branched alkyl group ranging from a 2 carbon atom position on the linear backbone, counting from a 1 carbon atom position which is bonded to $N^+$, to a ω-2 carbon atom position, where ω is a terminal carbon atom position on the linear backbone. In such embodiments, a methyl branch is at least 50% of the branching alkyl groups based on the total number of branches.

In some embodiments, the linear backbone, of each branched alkyl group of $[NR^1R^2R^3R^4]^+$, contains less 0.5 atom % of quaternary carbon atoms. In other embodiments, the linear backbone, of each branched alkyl group of $[NR^1R^2R^3R^4]^+$, is substantially free of quaternary carbon atoms.

The organoclay composition may contain sufficient quaternary ammonium ions to satisfy 50 to 150 percent of phyllosilicate cation exchange capacity. In some embodiments, the quaternary ammonium ions are in a concentration of 90 to 140 percent of phyllosilicate cation exchange capacity wherein the positive charge of the quaternary ion, in excess of the exchange capacity, is balanced by an inorganic anion or organic anion or an anionic polymer. In some embodiments, the quaternary ammonium ions are in a concentration of 95 to 130 percent of phyllosilicate cation exchange capacity wherein the positive charge of the quaternary ion, in excess of the exchange capacity, is balanced by an inorganic anion or organic anion or anionic polymer. Examples of organic anions are found in U.S. Pat. No. 5,718,841 which is incorporated by reference in its entirety herein.

Preparation of Quaternary Ammonium Ions

Quaternary ammonium ions are obtained when fatty amines are quaternized with alkylating agents such as methyl chloride, benzyl chloride and the like. Note that the fatty amines may contain one or more of alkyl chains per amine group. Various commercial processes have been developed to produce fatty (long alkyl chain) amines. Fatty acids can be readily converted into fatty amines using a nitrile path as outlined in U.S. Pat. No. 5,634,969 for instance. Fatty amines may also be prepared by reacting fatty alcohol with aminating agents as disclosed in, for instance, U.S. Pat. Nos. 4,683,336 or 4,994,620. Alternatively, long alkyl chain internal- and/or terminal-olefins can be converted into fatty amines via hydrobromination and reaction with aminating agents as disclosed in U.S. Pat. Nos. 4,024,189 or 7,342,136. Said olefins can be obtained through oligomerization of shorter olefins or by cracking larger paraffin wax type molecules.

Fatty alkyl chains can be derived from a variety of natural oleo-chemical sources. These sources can be used to supply raw materials for either the nitrile or alcohol routes that yield fatty amines. Palm or tallow fatty acids are popular raw materials for organoclay manufacture because of cost and availability. The majority of fatty acids that are derived from animal or plant sources are linear. Fatty acids can be converted to fatty alcohol which then are used in the fatty alcohol route to make fatty amines.

Saturated branched chain fatty acids can also be obtained from natural fatty acids. Isostearic acid is a byproduct in the dimer acid production but yields are relatively low making such materials expensive. Recently, significant advances have been made to isomerize natural feed stocks so that linear alkyl chains can be converted into branched alkyl chains, U.S. Pat. No. 5,677,473. Technology described in US 2011/0263884 discloses a high yield skeletal isomerization process of unsaturated linear fatty acids such as oleic acid. The process is highly selective and cost effective (Ind. Eng. Chem. Res. 2012, 51, 12041-12045). Isostearic acid typically is an isomeric mixture where the branching occurs at various positions along the chain. Isostearic acids are commercially available under the Century, Emersol, Emery, Oxocol and Prisorine brand names.

Petrochemical processes have been developed that convert natural gas or olefins such as ethylene, propylene and the like, into fatty alkyl chains to prepare products such as, for example, fatty alcohols. Cracking of paraffin can also yield long chain olefins that can be converted into fatty alcohols via a hydroformylation process. The performance of petrochemical based linear primary alcohols and derivatives are in many applications comparable to oleo-based alcohol products because the chemical composition is essentially the same. However, the various petrochemical processes can also yield chains with a certain degree of branching. Ziegler, Fisher-Tropsch, Oxo and Querbet alcohols all contain varying degrees of branched alkyl chains. Typical long chain petrochemical alcohols that are commercially available are NEODOL (Shell), EXXAL (Exxon) and ALFOL, SAFOL, MARLIPAL, ISALCHEM, ALCHEM and LIAL (Sasol) alcohols. U.S. Pat. Nos. 5,849,960, 6,150,322, 7,781,390 and references therein describe processes and compositions of linear as well as branched petrochemical alcohols. The skeletal isomerization of long chain olefins into branched olefins followed by selective hydroformylation yield branched alcohols such as NEODOL 67, which is a highly branched alcohol (Handbook of Detergents, Part F: Production). Hence, alkyl branching can occur at any location around the alkyl chain, and the branching group can be methyl, ethyl or even longer alkyl groups. The average number of branching per alkyl chain can be determined with $^1H$ and $^{13}C$ NMR analysis, while alkyl chain length distribution can be estimated with GC. An average branching per alkyl chain above unity means that some alkyl chains have more than one branch per alkyl chain.

Phyllosilicate Clays

Phyllosilicate clay includes natural or synthetic phyllosilicate clay, or mixtures thereof, which undergo ion exchange reactions with quaternary ammonium cations forming an organoclay. Representative natural phyllosilicate clays include smectites, palygorskite, sepiolite, vermiculites, and micas. Examples of smectite-type clays include montmorillonite, bentonite, hectorite, saponite, stevensite, and beidellite. In some embodiments, the phyllosilicate clay includes swelling clays such as hectorite and Wyoming-type bentonite. In some embodiments, the phyllosilicate clay is a mixture of hectorite and bentonite. Bentonite and its properties are described at length in the chapter entitled "Bentonite," in Carr, D., ed. 1994, Industrial Minerals and Rocks, 6th Edition (published by the Society For Mining, Metallurgy and Exploration, Colorado). Smectite-type clays are well known in the art and are commercially available from a variety of sources. Phyllosilicate clays useful in accordance with the present invention are described in detail in "Hydrous Phyllosilicates, Reviews in Mineralogy, Volume 19, S. W. Bailey, editor." Other useful literature can be found in Elsevier book series entitled "Developments in Clay Science", in particular Volume 5 entitled "Handbook of Clay Science."

Smectite clays which are layered, platy, hydrophilic silicate materials. In the dry state, several nano-sized clay layers are normally stacked on top of each other and these stacks, or tactoids, are agglomerated into particles. However, the platelets spontaneously separate from each other when dry clay powder is dispersed in water. This "delamination of layers" is at times also referred to as "exfoliation of layers." Smectite clay layers carry a net negative charge on the platelets that is neutralized by metal cations that are positioned on the surfaces of the platelets. An organoclay is formed when the metal cations are exchanged with organic cations. This reaction may be partially completed or driven to completion. Organic surface treatment is often necessary to improve the compatibility of the clay with organic systems. Similar to "pristine" inorganic clays in water, organoclays can delaminate in organic systems (solvents, polymers): i.e. the clay layers that are now decorated with organic cations are separated from each other when they are exfoliated in said systems.

In an embodiment, the phyllosilicate clay may include crude clay or beneficiated clay. The crude clay contains gangue or non-clay material whereas the gangue material has been largely removed from the beneficiated clay. In an embodiment using crude clay, substantial cost savings may be realized because the steps for the clay beneficiation process and conversion to the sodium form are eliminated.

In some embodiments, the phyllosilicate clays include synthetic phyllosilicate clays including synthetic vermiculite, synthetic smectite, synthetic hectorite, synthetic fluorohectorite and synthetic mica. The performance of synthetic clay based organoclays may differ, either positively or negatively, from those based on naturally occurring clays. These differences may be due to chemical composition and homogeneity thereof, ion exchange capacity, location of the ion exchange sites, impurities, surface area, platelet size and distribution, and or other reasons. These clays, also, may optionally be purified if desired.

The exchangeable inorganic cations of the phyllosilicate clay may be sodium or another cation. Preferably the exchangeable cations will be sodium. In some embodiments, the exchangeable cations can be a mixture of sodium, magnesium and calcium. In one embodiment, the sodium form of the smectite clay may be used. To prepare the sodium form of one embodiment, bentonite clay may be converted to the sodium form by preparing an aqueous clay slurry and passing the slurry through a bed of cation exchange resin in the sodium form. In another embodiment, the sodium form of the smectite clay may be prepared by mixing the clay with water and a soluble sodium compound, such as sodium carbonate, sodium hydroxide, etc.

In an embodiment, the phyllosilicate clay includes smectite-type clay having a cation exchange capacity of at least 45 mMols per 100 grams of clay, 100% active clay basis, as determined by the well-known ammonium acetate method or equivalent method. In another embodiment, the phyllosilicate clay includes smectite-type clay having a cation exchange capacity of at least 75 mMols per 100 grams of clay, 100% active clay basis.

The clay may be either sheared or non-sheared forms of the above-listed smectite clays. In one embodiment, the sheared form of the smectite clay may provide improved performance as compared to non-sheared clay material. Elementis Specialties, Inc. and its predecessor have issued patents describing the shearing of smectite clay, as described in U.S. Pat. Nos. 4,695,402 and 4,742,098 which are incorporated herein by reference in their entirety.

The organoclays, described herein, may be used in a variety of applications. In some embodiments, the organoclays may be used a rheology modifiers, anti-settling agents, sag control additives, or as adsorbants or as absorbants where the organoclay will host other ion pairs within the gallery. In some embodiments, the organoclays may be used as additives in greases, adhesives, sealants, inks, consumer products such as lipstick, deodorant, nail polish and the like.

In some embodiments, the organoclays, described herein, may be used in coating systems where the organoclay is dispersible in organic or solvent-based i.e. non-aqueous, fluids or aqueous systems to provide a wide variety of rheological and viscosity-modifier properties to such fluids. These non-aqueous fluids include oil-based paints and coatings as well as oil-based inks, drilling fluids, caulks and adhesives.

Coating Composition

In one embodiment, the organoclay compositions described herein may be used as a rheological additive for a non-aqueous fluid system.

In one embodiment, such organoclays may be used as a drilling fluid additive as set forth below.

Preparation of the Drilling Fluids

In some embodiments, compositions according to the present invention may be used as an additive to oil- or synthetic-based drilling fluids. In some embodiments, compositions according to the present invention may be used as an additive for oil- or synthetic-based invert emulsion drilling fluids employed in a variety of drilling applications.

The term oil- or synthetic-based drilling fluid is defined as a drilling fluid in which the continuous phase is hydrocarbon based. Oil- or synthetic-based drilling fluids formulated with over 5% water or brine may be classified as oil- or synthetic-based invert emulsion drilling fluids. In some embodiments, oil- or synthetic-based invert emulsion drilling fluids may contain water or brine as the discontinuous phase in any proportion up to about 5%, 10%, 15%, 20%, 25%, 30% or 50%. Oil muds may include invert emulsion drilling fluids as well as all oil based drilling fluids using synthetic, refined or natural hydrocarbon base as the external phase.

According to some embodiments, a process for preparing invert emulsion drilling fluids (oil muds) involves using a mixing device to incorporate the individual components making up that fluid. In some embodiments, primary and secondary emulsifiers and/or wetting agents (surfactant mix) are added to the base oil (continuous phase) under moderate agitation. The water phase, typically a brine, may be added to the base oil/surfactant mix along with alkalinity control agents and acid gas scavengers. In some embodiments, rheological additives as well as fluid loss control materials, weighting agents and corrosion inhibition chemicals may also be included. The agitation may then be continued to ensure dispersion of each ingredient and homogenize the resulting fluidized mixture.

Base Oil/Continuous Phase

According to some embodiments, diesel oil, mineral oil, synthetic oil, vegetable oil, fish oil, paraffinics, and/or ester-based oils can all be used as single components or as blends.

Brine Content

In some embodiments, water in the form of brine is often used in forming the internal phase of the drilling fluids. According to some embodiments, water can be defined as an aqueous solution which can contain from about 10 to 350,000 parts-per-million of metal salts such as lithium, sodium, potassium, magnesium, cesium, or calcium salts. In some embodiments, brines used to form the internal phase of a drilling fluid according to the present invention can also contain about 5% to about 35% by weight calcium chloride and may contain various amounts of other dissolved salts such as sodium bicarbonate, sodium sulfate, sodium acetate, sodium borate, potassium chloride, sodium chloride or formates (such as sodium, calcium, or cesium). In some embodiments, glycols or glycerin can be used in place of or in addition to brines.

In some embodiments, the ratio of water (brine) to oil in the emulsions according to the present invention may provide as high a brine content as possible while still maintaining a stable emulsion. In some embodiments, suitable oil/brine ratios may be in the range of about 97:3 to about 50:50. In some embodiments, suitable oil/brine ratios may be in the range of about 90:10 to about 60:40, or about 80:20 to about 70:30. In some embodiments, the preferred oil/brine ratio may depend upon the particular oil and mud weight.

According to some embodiments, the water content of a drilling fluid prepared according to the teachings of the invention may have an aqueous (water) content of about 0 to 50 volume percent Emulsifiers According to some embodiments, an emulsifier can also be added to the drilling fluid in order to form a more stable emulsion. The emulsifier may include organic acids, including but not limited to the monocarboxyl alkanoic, alkenoic, or alkynoic fatty acids containing from 3 to 20 carbon atoms, and mixtures thereof. Examples of this group of acids include stearic, oleic, caproic, capric and butyric acids. In some embodiments, adipic acid, a member of the aliphatic dicarboxylic acids, can also be used. According to some embodiments, suitable surfactants or emulsifiers include fatty acid calcium salts and lecithin. In other embodiments, suitable surfactants or emulsifiers include oxidized tall oil, polyaminated fatty acids, and partial amides of fatty acids.

In some embodiments, heterocyclic additives such as imidazoline compounds may be used as emulsifiers and/or wetting agents in the drilling muds. In other embodiments, alkylpyridines may be used to as emulsifiers and/or wetting agents in the drilling muds.

Industrially obtainable amine compounds for use as emulsifiers may be derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines may be of significance in this regard. In some embodiments, polyamines, particularly lower polyamines of the corresponding alkylenediamine type, are also suitable for opening of the epoxide ring.

Another class of the oleophilic amine compounds that may be suitable as emulsifiers are aminoamides derived from preferably long-chain carboxylic acids and polyfunctional, particularly lower, amines of the above-mentioned type. In some embodiments, at least one of the amino functions is not bound in amide form, but remains intact as a potentially salt-forming basic amino group. The basic amino groups, where they are formed as secondary or tertiary amino groups, may contain hydroxyalkyl substituents and, in particular, lower hydroxyalkyl substituents containing up to five and in some embodiments up to three carbon atoms in addition to the oleophilic part of the molecule.

According to some embodiments, suitable N-basic starting components for the preparation of such adducts containing long-chain oleophilic molecule constituents may include but are not limited to monoethanolamine or diethanolamine.

Weight Agents

In some embodiments, weighting materials are also used to weight the drilling fluid additive to a desired density. In some embodiments, the drilling fluid is weighted to a density of about 8 to about 18 pounds per gallon and greater. Suitable weighting materials may include barite, ilmenite, calcium carbonate, iron oxide and lead sulfide. In some embodiments, commercially available barite is used as a weighting material.

Filtrate Reduces

In some embodiments, fluid loss control materials are added to the drilling fluid to control the seepage of drilling fluid into the formation. In some embodiments, fluid loss control materials are lignite-based or asphalt-based. Suitable filtrate reducers may include amine treated lignite, gilsonite and/or elastomers such as styrene butadiene.

Blending Process

In some embodiments, drilling fluids may contain about 0.1 pounds to about 15 pounds of the drilling fluid additive per barrel of fluids. In other embodiments, drilling fluids may contain about 0.1 pounds to about 10 pounds of the drilling fluid additive per barrel of fluids, and in still other embodiments, drilling fluids may contain about 0.1 pounds to about 5 pounds of the drilling fluid additive per-barrel of fluids.

As shown above, a skilled artisan will readily recognize that additional additives such as weighting agents, emulsifiers, wetting agents, viscosifiers, fluid loss control agents, and other agents can be used with a composition according to the present invention. A number of other additives besides rheological additives regulating viscosity and anti-settling properties can also be used in the drilling fluid so as to obtain desired application properties, such as, for example, anti-settling agents and fluid loss-prevention additives.

Method of Use

In some embodiments, a drilling fluid additive may be added to a drilling fluid. In some embodiments, the drilling fluid additive may be added to a drilling fluid in combination with other additives.

In some embodiments, a drilling fluid additive is added to a drilling fluid in an amount of about 0.1 ppb to about 30 ppb. In other embodiments, a drilling fluid additive is added to a drilling fluid in an amount of about 0.25 ppb to about 15.0 ppb. In other embodiments, a drilling fluid additive is added to a drilling fluid in an amount of about 0.5 ppb to about 10.0 ppb. In some embodiments, a drilling fluid additive is added to a drilling fluid in an amount of about 2.5 ppb. In some embodiments, a drilling fluid additive is added to a drilling fluid in an amount of about 5.0 ppb. In some embodiments, a drilling fluid additive is added to a drilling fluid in an amount of about 10.0 ppb. In some embodiments, a drilling fluid additive is added to a drilling fluid in an amount of about 15.0 ppb. In some embodiments, a drilling fluid additive is added to a drilling fluid in an amount of about 20.0 ppb. In some embodiments, a smaller amount of a drilling fluid additive of the present invention is required to achieve comparable rheological stability results as a known drilling fluid additive.

The drilling fluid additive and drilling fluid may be characterized by several rheological or hydraulic aspects, i.e., ECD, high shear rate viscosity, low shear rate viscosity, plastic viscosity, regulating property viscosity and yield point, of a drilling fluid. The rheological aspects may be determined using a Fann viscometer as per standard procedures found in API RP13B-2 "Standard Procedures for Field Testing Oil-based Drilling Fluids". Viscosity readings can be measured at 600 rpm, 300 rpm, 200 rpm, 100 rpm, 6 rpm and 3 rpm. ECD can be determined by: standard hydraulics calculations found in API RP13D "Rheology and Hydraulics of Oil-well Drilling Fluids." For the purposes of this invention high shear rate viscosity ("HSR") corresponds to the viscosity measured at 600 rpm as per API RP13B-2 procedures. For the purposes of this invention, low shear rate viscosity ("LSR") corresponds to the viscosity measured at 6 rpm as per API RP 13B-2 procedures. Plastic viscosity ("PV") corresponds to the 600 rpm reading minus the 300 rpm reading. Yield Point ("YP") corresponds to the 300 rpm reading minus plastic viscosity.

In some embodiments, the addition of the drilling fluid additive to a drilling fluid results in a substantially constant ECD as temperature is varied over a range of about 120° F. to about 40° F. For the purposes of this invention, a substantially constant ECD may include a decrease or increase in ECD over such temperature variation. In one embodiment, the increase in ECD may include: up to 0.5%; up to 1%; up to 2%, up to 3%, up to 4%; up to 5%; up to 10%; up to 20%; up to 30%; and up to 40%. In one embodiment, the decrease in ECD may include: up to 0.5%; up to 1%; up to 2%, up to 3%, up to 4%; up to 5%; up to 10%; up to 20%; up to 30%; and up to 40%. In one embodiment, the increase in ECD may range from 1% up to 10%. In another embodiment, the increase in ECD may range from 1% up to 5%.

In some embodiments, the addition of the organoclay drilling fluid additive to a drilling fluid results in a substantially constant rheological profile throughout a temperature range. A substantially constant rheological profile of a drilling fluid may be determined by the change in viscosity of the drilling fluid as the temperature of the drilling fluid is reduced from bottom hole temperature typically encountered in deep water drilling, to temperatures typically encountered in the riser in deep water drilling. In some embodiments, the rheological profile of a drilling fluid is measured in terms of the increase in high rate (600 rpm) Fann 35A viscosity of the drilling fluid when the drilling fluid is cooled from about 120° F. to about 40° F. In some embodiments, a substantially constant rheological profile is achieved when the change in high shear rate viscosity of a drilling fluid is less than about 90% over a temperature range of about 120° F. to about 40° F. In other embodiments, a substantially constant rheological profile is achieved when the change in high shear rate viscosity of a drilling fluid is less than about 85% over a temperature range of about 120° F. to about 40° F. In some embodiments, a substantially constant rheological profile is achieved when the change in high shear rate viscosity is less than about 80% over a temperature range of about 120° F. to about 40° F. In some embodiments, a substantially constant rheological profile is achieved when the change in high shear rate viscosity is less than about 75% over a temperature range of about 120° F. to about 40° F. In other embodiments, a substantially constant rheological profile is achieved when the change in high shear rate viscosity of a drilling fluid is less than about 70% over a temperature range of about 120° F. to about 40° F. In other embodiments, a substantially constant rheological profile is achieved when the change in high shear rate viscosity of a drilling fluid is less than about 65% over a temperature range of about 120° F. to about 40° F. In other embodiments, a substantially constant rheological profile is achieved when the change in high shear rate viscosity of a drilling fluid is less than about 60% over a temperature range of about 120° F. to about 40° F. In other embodiments, a substantially constant rheological profile is achieved when the change in high shear rate viscosity of a drilling fluid is less than about 55% over a temperature range of about 120° F. to about 40° F. In other embodiments, a substantially constant rheological profile is achieved when the change in high shear rate viscosity of a drilling fluid is less than about 50% over a temperature range of about 120° F. to about 40° F. The viscosity of the drilling fluid may be measured according to API RP 13B procedures.

In some embodiments, a drilling fluid according to the present invention may have a lower viscosity at 40° F. than conventional muds formulated with sufficient conventional organoclay to provide suspension at bottom hole temperatures. When used in drilling operations, drilling fluids according to the present invention may allow the use of a lower pumping power to pump drilling muds through long distances, thereby reducing down-hole pressures. Consequently, in some embodiments, whole mud loss, fracturing and damage of the formation are all minimized. In some embodiments, drilling fluids according to the present invention may maintain the suspension characteristics typical of higher levels of conventional organoclays at higher temperatures. Such suspension characteristics may reduce the tendency of the mud to sag. Sag may include the migration of weight material, resulting in a higher density mud at a lower fluid fraction and a lower density mud at a higher fluid fraction. A reduction of sag may be valuable in both deep water drilling as well as conventional (non deep water) drilling. The present invention may be particularly useful in deep water drilling when the mud is cooled in the riser. A mud using a drilling fluid additive according to the present invention will maintain a reduced viscosity increase in the riser when compared to drilling fluids containing conventional rheological additives.

Blending Process

Drilling fluids preparations preferably contain between ¼ and 20 pounds of the inventive mixture per barrel of fluids, more preferred concentration is ¼ to 10 pounds-per-barrel and most preferably ¼ to 5 pounds-per-barrel.

As shown above, a skilled artisan will readily recognize that additional additives: weighting agents, emulsifiers, wetting agents, viscosifiers, fluid loss control agents, and other agents can be used with this invention. A number of other additives besides rheological additives regulating viscosity and anti-settling properties, providing other properties, can also be used in the fluid so as to obtain desired application properties, such as, for example, anti-settling agents and fluid loss-prevention additives.

The drilling fluids of the present invention generally have a lower high shear rate viscosity at 40° F. than conventional muds formulated with sufficient conventional organoclay to provide suspension at bottom hole temperatures. When used in drilling operations, the present drilling fluids allow the use of a lower pumping power to pump drilling muds through long distances, thereby reducing down-hole pressures. Consequently, fluid loss, fracturing and damage of the formation are all minimized. The present invention is particularly useful in deep water drilling when the mud is cooled in the riser. A mud using the described invention will maintain a reduced viscosity increase in the riser when compared to drilling fluids containing conventional rheological additives. One advantage is a stable rheological profile which corresponds to a substantially constant equivalent circulating density over a temperature range of about 120° F. to about 40° F.

For the purposes of this application, the term "about" means plus or minus 10%.

EXAMPLES

The following examples further describe and demonstrate illustrative embodiments within the scope of the present invention. The examples are given solely for illustration and are not to be construed as limitations of this invention as many variations are possible without departing from the spirit and scope thereof.

Quaternary ammonium compounds bearing branched alkyl groups may be made with any known process. Non limiting synthesis examples to prepare such branched quaternary ammonium compounds are given below starting with branched alcohols as branched alkyl source or branched fatty acids as the branched alkyl source.

Example 1

A. Synthesis Of Benzyl Dimethyl (Branched Alkyl) Quaternary Ammonium Chloride

Step 1: Synthesis of a (branched alkyl) bromide from a (branched alkyl) alcohol.

In a 1 L, three-necked flask, fitted with a mechanical stirrer, a thermometer, and a dropping funnel, is placed 113 g of Neodol 67 alcohol. The alcohol is cooled to 0° C. by immersing the flask in an ice bath, and 55 g of phosphorus tribromide is slowly added with stirring at such a rate as to keep the temperature at 0° C. (about two hours). The cooling bath is removed, and stirring is continued until the mixture reaches room temperature; it is then allowed to stand overnight.

To the flask was added 200 ml diethyl ether and 200 ml deionized water. The pH of the mixture was adjusted to neutral with 5% potassium hydroxide under ice bath cooling. Subsequently the solution was transferred to a separatory funnel, the bottom layer was drained and the top layer was washed with brine solution three times. The top layer was then collected and filtered to remove white precipitate; about 105 g of branched alkyl bromide was thus collected after diethyl ether was removed by rota-evaporation.

Neodol 67 (Shell) mainly is a mixture of C16 and C17 branched primary alcohols and is produced through selective hydroformylation of branched olefins, which are derived from ethylene. The hydrocarbon backbone of Neodol 67 is linear with one or more methyl branching groups directly bonded to the backbone. These methyl branches are distributed along the backbone.

Step 2: Synthesis of a dimethyl (branched alkyl) tertiary amine

A total of 30.7 g of branched alkyl bromide (from Step 1) was added to 147 ml of dimethylamine ethanolic solution. The mixture is stirred at room temperature for 24 h, then a 10% aqueous solution of sodium hydroxide is added and the mixture is extracted three times with diethyl ether. The organic layers were washed, dried and then concentrated.

Step 3: Synthesis of benzyl dimethyl (branched alkyl) quaternary ammonium chloride A four-neck, 250 mL round-bottom flask equipped with a reflux condenser, thermocouple and 2 glass stoppers is charged with 20 g of dimethyl (branched alkyl) tertiary amine (from Step 2), 5.8 g of benzyl chloride and roughly 100 mL isopropyl alcohol. Next, 3.5 g of sodium bicarbonate was added to the mixture under stirring and the flask was kept at 75° C. for 48 hours. Then the reaction mixture was filtered hot over a Büchner funnel equipped with filter paper to remove solid sodium bicarbonate. Ethanol was removed by rota-evaporation, and the residue was dissolved in 100 ml of diethyl ether and extracted with three portions of 100 ml deionized water, all aqueous extracts were then combined and water was removed by rota-evaporation.

B. Organoclay Preparation

A sodium bentonite clay ore from Wyoming was dispersed in water at about 5 wt. % clay solids. The crude clay slurry was mixed overnight at ambient temperature and then centrifuged to yield a beneficiated clay slurry. Roughly 30 wt % of the crude bentonite clay was discarded during the beneficiation process, and the resulting purified clay slurry was ion exchanged into the sodium form prior to shearing with a Manton Gaulin homogenizer. The beneficiated and sheared clay had a cation exchange capacity of about 102 milliequivalents (meq.) per 100 grams clay as determined by the methylene blue method. The clay slurry was diluted with water to yield 2% clay solids at reaction and then heated to 65° C. prior to reaction with a certain cation exchange equivalent of benzyl dimethyl (branched alkyl) quaternary ammonium chloride, per 100 grams of clay (dry basis). After reaction, the organoclay was filtered, dried in a forced air oven set at 45° C. and milled to a fine powder. The sample was labeled 3383-11-2.

Example 2

Synthesis Of Dimethyl Di(Branched Alkyl) Quaternary Ammonium Bromide

Using a branched petrochemical alcohol as the starting material, a (branched alkyl) bromide and dimethyl (branched alkyl) tertiary amine were prepared as described in steps 1 and 2 of Example 1A.

A four-neck, 250 mL round-bottom flask equipped with a reflux condenser, thermocouple and 2 glass stoppers is charged with 25 g of dimethyl (branched alkyl) tertiary amine, 15.2 g of (branched alkyl) bromide and about 100 mL isopropyl alcohol. Next, 4.4 g of sodium bicarbonate was added to the mixture under stirring and the flask was kept at 75° C. for 120 hours or longer until the amine value is below one. Then the reaction mixture was filtered hot over a Büchner funnel equipped with filter paper to remove solid sodium bicarbonate. Isopropyl alcohol was removed by rota-evaporation. Purity of the final product was confirmed with $^1$H NMR.

Organoclay Preparation

An organoclay was prepared according to the procedure of Example 1B using dimethyl di(branched alkyl) quaternary ammonium bromide as the quaternary ammonium compound. The organoclay sample was labeled 3279-36-1.

Example 3

A. Synthesis Of Dimethyl Di(Branched Alkyl) Quaternary Ammonium Bromide

A dimethyl di(branched alkyl) quaternary ammonium bromide compound was prepared as described in Example 1A where the branched alkyl group was derived from a branched fatty acid compound.

Step 1: Prisorene 3515 (Croda) isostearyl alcohol was used in the synthesis of a branched alkyl bromide in a similar manner as described in Example 1, Step A1. Prisorene 3515 is a fully hydrogenated alcohol and is derived from isostearic acid, which is a branched-chain fatty acid derived from vegetable oils or animal fats. Isosteraric acid is not a single molecule, but a rich isomeric mixture in which the branching occurs at different positions along the alkyl chain. The branching is short, mostly methylenic and multiple branching also occurs in small amounts.

Step 2: Synthesis of a dimethyl (branched alkyl) tertiary amine

The branched alkyl bromide, derived from isostearyl alcohol, was mixed with dimethylamine ethanolic solution. The mixture is stirred at room temperature for 24 h, then a 10% aqueous solution of sodium hydroxide is added and the mixture is extracted three times with diethyl ether. The organic layers were washed, dried and then concentrated.

Step 3: Synthesis of dimethyl di(branched alkyl) quaternary ammonium bromide

The procedure of Example 2 was followed using the branched alkyl bromide and dimethyl (branched alkyl) tertiary amine each derived from isostearyl alcohol.

B. Organoclay Preparation

An organoclay was prepared according to Example 1B, using a cation exchange equivalent of a dimethyl di(branched alkyl) quaternary ammonium bromide compound where the branched alkyl groups were obtained from an isostearyl alcohol. The sample was labeled sample was labeled 3279-22-2.

Comparative Example 1

Following the procedure of Example 1B, a control organoclay was prepared using a commercially available benzyl dimethyl hydrogenated tallow quaternary ammonium chloride and this sample was labeled as 3383-11-1.

Comparative Example 2

Following the procedure of Example 1B, a control organoclay was prepared with commercially available dimethyl dihydrogenated tallow ammonium chloride and this sample was labeled 3279-22-1.

Comparative Example 3

A polyamide was prepared as described in U.S. Pat. Nos. 7,345,010 and 7,799,742 each of which is incorporated by reference in its entirety herein.

Testing of Branched Alkyl Compositions

Mud compositions were prepared for evaluation based on Formulation 1 that contained a synthetic IAO as a base oil and were weighted to 13 ppg with an oil:water ratio of 75:25.

TABLE 1

| Formulation 1 | | |
|---|---|---|
| Raw Materials | Charge (g) | |
| Base Oil: IAO | 172 | |
| Primary Emulsifier: | 10 | MultiMixer Mix 2 min. |
| 25% Calcium Chloride Brine | 69 | MultiMixer Mix 4 min. |
| Lime | 10 | MultiMixer Mix 4 min. |
| Tested Additive | (See Tables) | MultiMixer Mix 5 min. |
| Weighting Agent: Barite | 270 | MultiMixer Mix 30 min. |

The mud compositions were dynamically aged using a roller oven for 16 hours at 150° F., then statically aged for 16 hrs at 40° F., then were dynamically aged for 16 hours at 250° F., 300° F., and 350° F. using a roller oven. After the muds were water cooled for one hour, they were mixed on a Hamilton beach MultiMixer for 10 minutes. Viscosity measurements of the muds were measured using the Fann OFI-900 at 120° F. initially and after each thermal cycle using test procedures API RP 13B. For 40° F. static aging, the test was made at 40° F.

Example 4

Organoclay 3279-36-1 (Example 2), was prepared using Formulation 1 and tested as discussed above. The rheological profile is shown below in Table 2.

TABLE 2

| OFI 900 Visc. @ 120° F. | ppb 3279-36-1 Test Conditions ||||||
|---|---|---|---|---|---|---|
| | 4 ppb Initial 120° F. Test | 4 ppb HR 150° F. 120° F. Test | 4 ppb SA 40° F. 40° F. Test | 4 ppb HR 250° F. 120° F. Test | 4 ppb HR 300° F. 120° F. Test | 4 ppb HR 350° F. 120° F. Test |
| 600 RPM Reading | 66 | 58 | 115 | 69 | 66 | 44 |
| 300 RPM Reading | 42 | 36 | 68 | 43 | 41 | 23 |
| 200 RPM Reading | 33 | 28 | 51 | 34 | 32 | 13 |
| 100 RPM Reading | 23 | 19 | 33 | 24 | 22 | 8 |
| 6 RPM Reading | 10 | 8 | 11 | 10 | 9 | 2 |
| 3 RPM Reading | 9 | 7 | 9 | 9 | 9 | 1 |
| Apparent Visc., cPs | 33 | 29 | 58 | 35 | 33 | 22 |
| Plastic Visc., cPs | 24 | 22 | 47 | 26 | 25 | 21 |
| Yield Point, Lbs/100 ft$^2$ | 18 | 14 | 21 | 17 | 16 | 2 |
| Electrical Stability | 883 | 1067 | 1067 | 1059 | 932 | 581 |
| 10 Sec Gel | 10 | 10 | 11 | 11 | 11 | 2 |
| 10 Min Gel | — | 14 | 17 | 17 | 17 | 3 |

Example 5

Organoclay 3279-36-1 (Example 2), was prepared using Formulation 1 and tested as discussed above. The rheological profile is shown below in Table 3.

TABLE 3

| OFI 900 Visc. @ 120° F. | ppb 3279-36-1 Test Conditions ||||||
|---|---|---|---|---|---|---|
| | 7 ppb Initial 120° F. Test | 7 ppb HR 150° F. 120° F. Test | 7 ppb SA 40° F. 40° F. Test | 7 ppb HR 250° F. 120° F. Test | 7 ppb HR 300° F. 120° F. Test | 7 ppb HR 350° F. 120° F. Test |
| 600 RPM Reading | 100 | 88 | 197 | 109 | 101 | 47 |
| 300 RPM Reading | 68 | 55 | 118 | 73 | 66 | 27 |
| 200 RPM Reading | 56 | 44 | 88 | 59 | 55 | 18 |
| 100 RPM Reading | 43 | 32 | 57 | 44 | 41 | 11 |
| 6 RPM Reading | 20 | 15 | 19 | 22 | 21 | 4 |
| 3 RPM Reading | 19 | 14 | 17 | 20 | 19 | 3 |
| Apparent Visc., cPs | 50 | 44 | 99 | 55 | 51 | 24 |
| Plastic Visc., cPs | 32 | 33 | 79 | 36 | 35 | 20 |
| Yield Point, Lbs/100 ft$^2$ | 36 | 22 | 39 | 37 | 31 | 7 |
| Electrical Stability | 1128 | 1126 | 1126 | 1103 | 942 | 1012 |
| 10 Sec Gel | 25 | 17 | 20 | 24 | 24 | 5 |
| 10 Min Gel | — | 23 | 28 | 30 | 34 | 7 |
| ECD (ppg) | 13.6 | 13.4 | 13.8 | 13.7 | 13.6 | 13.2 |

Example 6

Organoclay 3279-36-1 (Example 2), was prepared using Formulation 1 and tested as discussed above. The rheological profile is shown below in Table 4.

TABLE 4

| OFI 900 Visc. @ 120° F. | ppb 3279-36-1 Test Conditions | | | | | |
|---|---|---|---|---|---|---|
| | 10 ppb Initial 120° F. Test | 10 ppb HR 150° F. 120° F. Test | 10 ppb SA 40° F. 40° F. Test | 10 ppb HR 250° F. 120° F. Test | 10 ppb HR 300° F. 120° F. Test | 10 ppb HR 350° F. 120° F. Test |
| 600 RPM Reading | 177 | 155 | 290 | 198 | 175 | 81 |
| 300 RPM Reading | 122 | 100 | 179 | 137 | 122 | 47 |
| 200 RPM Reading | 101 | 80 | 138 | 113 | 102 | 37 |
| 100 RPM Reading | 76 | 57 | 94 | 83 | 76 | 25 |
| 6 RPM Reading | 37 | 27 | 35 | 39 | 38 | 10 |
| 3 RPM Reading | 35 | 24 | 31 | 36 | 36 | 9 |
| Apparent Visc., cPs | 89 | 78 | 145 | 99 | 88 | 41 |
| Plastic Visc., cPs | 55 | 55 | 111 | 31 | 53 | 34 |
| Yield Point, Lbs/100 ft$^2$ | 67 | 45 | 68 | 76 | 69 | 13 |
| Electrical Stability | 1278 | 1291 | 1291 | 1331 | 860 | 1067 |
| 10 Sec Gel | 45 | 26 | 36 | 41 | 41 | 12 |
| 10 Min Gel | — | 34 | 51 | 49 | 55 | 17 |

Example 7

Organoclay 3279-36-1 (Example 2), and polyamide, comparative example 3, was prepared using Formulation 1 and tested as discussed above. The rheological profile is shown below in Table 5.

TABLE 5

| OFI 900 Visc. @ 120° F. | ppb Comparative Example 3 | | | | | |
|---|---|---|---|---|---|---|
| | 2 ppb | 2 ppb | 2 ppb | 2 ppb | 2 ppb | 2 ppb |
| | ppb 3279-36-1 Test Conditions | | | | | |
| | 4 ppb Initial 120° F. Test | 4 ppb HR 150° F. 120° F. Test | 4 ppb SA 40° F. 40° F. Test | 4 ppb HR 250° F. 120° F. Test | 4 ppb HR 300° F. 120° F. Test | 4 ppb HR 350° F. 120° F. Test |
| 600 RPM Reading | 89 | 95 | 182 | 85 | 70 | 46 |
| 300 RPM Reading | 61 | 62 | 109 | 56 | 43 | 26 |
| 200 RPM Reading | 50 | 49 | 81 | 46 | 33 | 20 |
| 100 RPM Reading | 37 | 35 | 49 | 34 | 22 | 12 |
| 6 RPM Reading | 19 | 17 | 14 | 19 | 12 | 4 |
| 3 RPM Reading | 18 | 15 | 12 | 18 | 11 | 4 |
| Apparent Visc., cPs | 45 | 48 | 91 | 43 | 35 | 23 |
| Plastic Visc., cPs | 28 | 33 | 73 | 29 | 27 | 20 |
| Yield Point, Lbs/100 ft$^2$ | 33 | 29 | 36 | 27 | 16 | 6 |
| Electrical Stability | 1634 | 1322 | 1322 | 1159 | 725 | 494 |
| 10 Sec Gel | 23 | 19 | 14 | 21 | 13 | 7 |
| 10 Min Gel | — | 31 | 24 | 37 | 29 | 17 |
| ECD (ppg) | 13.6 | 13.5 | 13.8 | 13.5 | 13.3 | 13.2 |

Example 8

Organoclay 3279-22-1 (Comparative example 2) was prepared using Formulation 1 and tested as discussed above. The rheological profile is shown below in Table 6.

TABLE 6

| OFI 900 Visc. @ 120° F. | ppb 3279-22-1 Test Conditions | | | | | |
|---|---|---|---|---|---|---|
| | 7 ppb Initial 120° F. Test | 7 ppb HR 150° F. 120° F. Test | 7 ppb SA 40° F. 40° F. Test | 7 ppb HR 250° F. 120° F. Test | 7 ppb HR 300° F. 120° F. Test | 7 ppb HR 350° F. 120° F. Test |
| 600 RPM Reading | 98 | 86 | 279 | 115 | 90 | 59 |
| 300 RPM Reading | 65 | 56 | 193 | 77 | 62 | 35 |
| 200 RPM Reading | 54 | 46 | 156 | 64 | 51 | 26 |
| 100 RPM Reading | 41 | 35 | 115 | 48 | 40 | 18 |
| 6 RPM Reading | 20 | 17 | 57 | 24 | 21 | 7 |
| 3 RPM Reading | 19 | 14 | 55 | 22 | 20 | 7 |
| Apparent Visc., cPs | 49 | 43 | 140 | 58 | 45 | 30 |
| Plastic Visc., cPs | 33 | 30 | 86 | 38 | 28 | 24 |
| Yield Point, Lbs/100 ft$^2$ | 32 | 26 | 107 | 39 | 34 | 11 |
| Electrical Stability | 1066 | 1339 | 1339 | 1193 | 1134 | 1166 |
| 10 Sec Gel | 24 | 16 | 58 | 25 | 23 | 8 |
| 10 Min Gel | — | 24 | 64 | 31 | 31 | 12 |
| ECD (ppg) | 13.6 | 13.5 | 14.8 | 13.7 | 13.6 | 13.3 |

Example 9

Organoclay 3279-22-1 (Comparative example 2) was prepared using Formulation 1 and tested as discussed above. The rheological profile is shown below in Table 7.

TABLE 7

| OFI 900 Visc. @ 120° F. | ppb 3279-22-1 Test Conditions | | | | | |
|---|---|---|---|---|---|---|
| | 4 ppb Initial 120° F. Test | 4 ppb HR 150° F. 120° F. Test | 4 ppb SA 40° F. 40° F. Test | 4 ppb HR 250° F. 120° F. Test | 4 ppb HR 300° F. 120° F. Test | 4 ppb HR 350° F. 120° F. Test |
| 600 RPM Reading | 60 | 61 | 110 | 66 | 60 | 40 |
| 300 RPM Reading | 38 | 37 | 71 | 42 | 38 | 22 |
| 200 RPM Reading | 30 | 29 | 56 | 33 | 30 | 14 |
| 100 RPM Reading | 21 | 20 | 38 | 23 | 21 | 8 |
| 6 RPM Reading | 9 | 9 | 16 | 11 | 9 | 2 |
| 3 RPM Reading | 8 | 8 | 15 | 10 | 8 | 2 |
| Apparent Visc., cPs | 30 | 31 | 55 | 33 | 30 | 20 |
| Plastic Visc., cPs | 22 | 24 | 39 | 24 | 22 | 18 |
| Yield Point, Lbs/100 ft$^2$ | 16 | 13 | 32 | 18 | 16 | 4 |
| Electrical Stability | 939 | 1060 | 1060 | 1120 | 959 | 626 |
| 10 Sec Gel | 11 | 9 | 16 | 12 | 12 | 2 |
| 10 Min Gel | — | 14 | 21 | 16 | 15 | 4 |

Example 10

Organoclay 3279-22-1 (Comparative example 2) was prepared using Formulation 1 and tested as discussed above. The rheological profile is shown below in Table 8.

TABLE 8

| | ppb 3279-22-1 Test Conditions | | | | | |
|---|---|---|---|---|---|---|
| OFI 900 Visc. @ 120° F. | 10 ppb Initial 120° F. Test | 10 ppb HR 150° F. 120° F. Test | 10 ppb SA 40° F. 40° F. Test | 10 ppb HR 250° F. 120° F. Test | 10 ppb HR 300° F. 120° F. Test | 10 ppb HR 350° F. 120° F. Test |
| 600 RPM Reading | 125 | 128 | 323 | 147 | 130 | 63 |
| 300 RPM Reading | 88 | 88 | 225 | 105 | 93 | 42 |
| 200 RPM Reading | 74 | 73 | 187 | 89 | 78 | 34 |
| 100 RPM Reading | 57 | 55 | 141 | 69 | 62 | 25 |
| 6 RPM Reading | 30 | 28 | 73 | 36 | 33 | 12 |
| 3 RPM Reading | 29 | 25 | 68 | 34 | 31 | 11 |
| Apparent Visc., cPs | 63 | 64 | 162 | 74 | 65 | 32 |
| Plastic Visc., cPs | 37 | 40 | 98 | 42 | 37 | 21 |
| Yield Point, Lbs/100 ft$^2$ | 51 | 48 | 127 | 63 | 56 | 21 |
| Electrical Stability | 1278 | 1089 | 1089 | 1438 | 762 | 1176 |
| 10 Sec Gel | 33 | 28 | 68 | 37 | 35 | 14 |
| 10 Min Gel | — | 38 | 84 | 46 | 45 | 19 |

A summary of rheological properties for various compositions prepared in Formula 1 is shown in Table 9.

TABLE 9

| | [Tested Sample] Concentrations | | | | | | | | | |
|---|---|---|---|---|---|---|---|---|---|---|
| | Comparative Example 1 | | Inventive Example 1 | | Inventive Example 2 | | Mixture of Comparative Examples 1 and 2 4/2 ppb | | Mixture of Inventive Example 1 and Comparative Example 2 4/2 ppb | |
| OFI 900 Visc. @ 120° F. | 7 ppb HR 150 F. 120 F. Test | 7 ppb SA 40 F. 40 F. Test | 7 ppb HR 150 F. 120 F. Test | 7 ppb SA 40 F. 40 F. Test | 7 ppb HR 150 F. 120 F. Test | 7 ppb SA 40 F. 40 F. Test | 4/2 ppb HR 150 F. 120 F. Test | 4/2 ppb SA 40 F. 40 F. Test | 4/2 ppb HR 150 F. 120 F. Test | 4/2 ppb SA 40 F. 40 F. Test |
| 600 RPM Reading | 86 | 279 | 88 | 197 | 83 | 196 | 87 | 178 | 95 | 182 |
| 300 RPM Reading | 56 | 193 | 55 | 118 | 55 | 116 | 56 | 105 | 62 | 109 |
| 200 RPM Reading | 46 | 156 | 44 | 88 | 45 | 87 | 44 | 78 | 49 | 81 |
| 100 RPM Reading | 35 | 115 | 32 | 57 | 34 | 57 | 31 | 49 | 35 | 49 |
| 6 RPM Reading | 17 | 57 | 15 | 19 | 17 | 21 | 17 | 19 | 17 | 14 |
| 3 RPM Reading | 14 | 55 | 14 | 17 | 15 | 19 | 15 | 17 | 15 | 12 |
| Apparent Visc., cPs | 43 | 140 | 44 | 99 | 42 | 98 | 44 | 89 | 48 | 91 |
| Plastic Visc., cPs | 30 | 86 | 33 | 79 | 28 | 80 | 31 | 73 | 33 | 73 |
| Yield Point, Lbs/100 ft$^2$ | 26 | 107 | 22 | 39 | 27 | 36 | 25 | 32 | 29 | 36 |
| Electrical Stability | 1339 | 1339 | 1126 | 1126 | 1314 | 1314 | 1541 | 1541 | 1322 | 1322 |
| 10 Sec Gel | 18 | 58 | 17 | 20 | 18 | 20 | 18 | 18 | 19 | 14 |
| 10 Min Gel | 24 | 62 | 23 | 28 | 25 | 29 | 30 | 29 | 31 | 24 |
| ECD (ppg) | 13.5 | 14.8 | 13.4 | 13.8 | 13.5 | 13.8 | 13.5 | 13.7 | 13.5 | 13.8 |

Example 11

A mixture of Comparative Example 2 and Comparative Example 3 was prepared using Formulation 1 and tested as discussed above. The rheological profile is shown below in Table 10.

TABLE 10

| | Comparative Example 3 | | | | | |
| --- | --- | --- | --- | --- | --- | --- |
| | 1 ppb | 1 ppb | 2 ppb | 2 ppb | 3 ppb | 3 ppb |
| | | | Comparative Example 2 | | | |
| OFI 900 Visc. @ 120° F. | 3 ppb Initial 120° F. Test | 3 ppb HR 150° F. 120° F. Test | 3 ppb Initial 120° F. Test | 3 ppb HR 150° F. 120° F. Test | 3 ppb Initial 120° F. Test | 3 ppb HR 150° F. 120° F. Test |
| 600 RPM Reading | 84 | 71 | 75 | 66 | 63 | 61 |
| 300 RPM Reading | 52 | 45 | 46 | 40 | 40 | 38 |
| 200 RPM Reading | 40 | 35 | 37 | 31 | 32 | 30 |
| 100 RPM Reading | 27 | 25 | 26 | 21 | 22 | 21 |
| 6 RPM Reading | 14 | 13 | 12 | 9 | 11 | 11 |
| 3 RPM Reading | 13 | 12 | 11 | 8 | 10 | 10 |
| Apparent Visc., cPs | 42 | 36 | 38 | 33 | 32 | 31 |
| Plastic Visc., cPs | 32 | 26 | 29 | 26 | 23 | 23 |
| Yield Point, Lbs/100 ft$^2$ | 20 | 19 | 17 | 14 | 17 | 15 |
| Electrical Stability | 668 | 975 | 1465 | 1322 | 1543 | 1586 |
| 10 Sec Gel | 20 | 17 | 15 | 11 | 13 | 12 |
| 10 Min Gel | — | 26 | — | 18 | — | 21 |

Example 12

A mixture of Comparative Example 2 and Comparative Example 3 was prepared using Formulation 1 and tested as discussed above. The rheological profile is shown below in Table 11.

TABLE 11

| | Comparative Example 3 | | | | | |
| --- | --- | --- | --- | --- | --- | --- |
| | 1 ppb | 1 ppb | 1 ppb | 1 ppb | 1 ppb | 1 ppb |
| | | | Comparative Example 2 | | | |
| OFI 900 Visc. @ 120° F. | 4 ppb Initial 120° F. Test | 4 ppb HR 150° F. 120° F. Test | 4 ppb SA 40° F. Test | 4 ppb HR 250° F. 120° F. Test | 4 ppb HR 300° F. 120° F. Test | 4 ppb HR 350° F. 120° F. Test |
| 600 RPM Reading | 87 | 74 | 133 | 82 | 69 | 42 |
| 300 RPM Reading | 57 | 48 | 82 | 55 | 44 | 24 |
| 200 RPM Reading | 45 | 38 | 63 | 44 | 35 | 16 |
| 100 RPM Reading | 32 | 28 | 43 | 33 | 25 | 10 |
| 6 RPM Reading | 17 | 14 | 19 | 18 | 13 | 3 |
| 3 RPM Reading | 16 | 13 | 18 | 17 | 12 | 3 |
| Apparent Visc., cPs | 44 | 37 | 67 | 41 | 35 | 21 |
| Plastic Visc., cPs | 30 | 26 | 51 | 27 | 25 | 18 |

TABLE 11-continued

| | Comparative Example 3 | | | | | |
|---|---|---|---|---|---|---|
| | 1 ppb | 1 ppb | 1 ppb | 1 ppb | 1 ppb | 1 ppb |
| | | | Comparative Example 2 | | | |
| OFI 900 Visc. @ 120° F. | 4 ppb Initial 120° F. Test | 4 ppb HR 150° F. 120° F. Test | 4 ppb SA 40° F. Test | 4 ppb HR 250° F. 120° F. Test | 4 ppb HR 300° F. 120° F. Test | 4 ppb HR 350° F. 120° F. Test |
| Yield Point, Lbs/100 ft² | 27 | 22 | 31 | 28 | 19 | 6 |
| Electrical Stability | 822 | 1044 | 1044 | 879 | 738 | 476 |
| 10 Sec Gel | 16 | 19 | 21 | 20 | 17 | 3 |
| 10 Min Gel | 23 | 28 | | 34 | 29 | 9 |
| ECD (ppg) | 13.5 | 13.4 | 13.6 | 13.5 | 13.4 | 13.2 |

Example 13

A mixture of Comparative Example 2 and Comparative Example 3 was prepared using Formulation 1 and tested as discussed above. The rheological profile is shown below in Table 12.

TABLE 12

| | Comparative Example 3 | | | | | |
|---|---|---|---|---|---|---|
| | 2 ppb | 2 ppb | 2 ppb | 2 ppb | 2 ppb | 2 ppb |
| | | | Comparative Example 2 | | | |
| OFI 900 Visc. @ 120° F. | 4 ppb Initial 120° F. Test | 4 ppb HR 150° F. 120° F. Test | 4 ppb SA 40° F. Test | 4 ppb HR 250° F. 120° F. Test | 4 ppb HR 300° F. 120° F. Test | 4 ppb HR 350° F. 120° F. Test |
| 600 RPM Reading | 105 | 87 | 178 | 83 | 68 | 47 |
| 300 RPM Reading | 70 | 56 | 105 | 54 | 43 | 27 |
| 200 RPM Reading | 57 | 44 | 78 | 43 | 34 | 21 |
| 100 RPM Reading | 42 | 31 | 49 | 31 | 24 | 13 |
| 6 RPM Reading | 23 | 17 | 19 | 17 | 14 | 5 |
| 3 RPM Reading | 22 | 15 | 17 | 15 | 13 | 5 |
| Apparent Visc., cPs | 53 | 44 | 89 | 42 | 34 | 24 |
| Plastic Visc., cPs | 35 | 31 | 73 | 29 | 25 | 20 |
| Yield Point, Lbs/100 ft² | 35 | 25 | 32 | 25 | 18 | 7 |
| Electrical Stability | 1395 | 1541 | 1541 | 1044 | 616 | 466 |
| 10 Sec Gel | 26 | 18 | 18 | 19 | 17 | 7 |
| 10 Min Gel | — | 30 | 29 | 35 | 35 | 16 |
| ECD (ppg) | 13.6 | 13.5 | 13.7 | 13.5 | 13.4 | 13.2 |

Example 14

A mixture of Comparative Example 2 and Comparative Example 3 was prepared using Formulation 1 and tested as discussed above. The rheological profile is shown below in Table 13.

TABLE 13

| | Comparative Example 3 | | | | | |
|---|---|---|---|---|---|---|
| | 3 ppb | 3 ppb | 3 ppb | 3 ppb | 3 ppb | 3 ppb |
| | | | Comparative Example 2 | | | |
| OFI 900 Visc. @ 120° F. | 4 ppb Initial 120° F. Test | 4 ppb HR 150° F. 120° F. Test | 4 ppb SA 40° F. Test | 4 ppb HR 250° F. 120° F. Test | 4 ppb HR 300° F. 120° F. Test | 4 ppb HR 350° F. 120° F. Test |
| 600 RPM Reading | 74 | 80 | 152 | 81 | 69 | 50 |
| 300 RPM Reading | 48 | 51 | 88 | 53 | 44 | 30 |
| 200 RPM Reading | 39 | 40 | 64 | 42 | 35 | 22 |
| 100 RPM Reading | 28 | 29 | 40 | 33 | 25 | 14 |
| 6 RPM Reading | 15 | 16 | 14 | 17 | 15 | 5 |
| 3 RPM Reading | 14 | 15 | 12 | 16 | 14 | 5 |
| Apparent Visc., cPs | 37 | 40 | 76 | 41 | 35 | 25 |
| Plastic Visc., cPs | 26 | 29 | 64 | 28 | 25 | 20 |
| Yield Point, Lbs/100 ft$^2$ | 22 | 22 | 24 | 25 | 19 | 10 |
| Electrical Stability | 1670 | 1733 | 1733 | 1137 | 888 | 503 |
| 10 Sec Gel | 18 | 18 | 14 | 21 | 22 | 8 |
| 10 Min Gel | — | 30 | | 35 | 38 | 19 |
| ECD (ppg) | 13.4 | 13.4 | 13.6 | 13.5 | 13.4 | 13.3 |

Example 15

The effect of temperature on the viscosity of a 100% solids epoxy coating was examined. The formulation of Table 14 was prepared.

TABLE 14

| Description: 800 g batch; 70 mm blade heavy duty; 1 L stainless steel jacketed mixing pot | |
|---|---|
| Formula & Procedure | |
| 1) Set water bath to 150° F./65° C. Add the following materials (+/−0.1 g). | 800 g |
| Epon 828 | 238.37 |
| Erysys GE-8 | 37.35 |
| Organoclay additive | 10.36 |
| Methanol/Water (95/5) Polar activator | 3.31 |
| 2) Add while mixing @ 300-700 rpm. | |
| TI Pure R-900 | 76.15 |
| Nicron 503 | 34.47 |
| Minex 4 | 34.47 |
| Heucophos ZPA (Heubach) | 5.60 |
| Wolastocoat 10 ES | 121.65 |
| Cimbar UF (Barytes) | 139.47 |
| 3) Add the following Let Down ingredients to mix pot (+/−0.1 g) | |
| Epon 828 | 96.94 |
| Tint -Ayd HS 20317 | 1.87 |
| 4) Mix 10 min at 1000 rpm at 120° F. while covered. | |
| Total | 800.00 |

Part B: Lite 2001 LV Amine (AHEW 132) 100 Part A: 28.25 Part B

The viscosity of the Part A system was measured at 72° F. and at 40 OF. The sag of the Part A+Part B expoxy coating was then measured. The results are shown in Table 15.

TABLE 15

| | Part "A" Brookfield viscosity, cp measured at 72° F. | Part "A" Brookfield viscosity, cp measured at 40 F. | PART "A" + PART "B" SAG, mils |
|---|---|---|---|
| Blank | 26800 | 164000 | 10 |
| Comparative example 1 | 48400 | 362000 | 18 |
| Example 1 | 49600 | 238000 | 19 |

The data in Table 15 demonstrates that for the Part A system, addition of the inventive organoclay of example 1 and the organoclay of comparative example 1 results in an increased viscosity and a thicker coating for the Part A+B system compared to Part A and Part A+B in the absence of organoclay. Comparison of the Part A system at 72° F. versus 40° F. shows that the inventive organoclay, example 1, increases the viscosity but advantageously not to the degree as the organoclay of comparative example 1.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A method of providing a substantially constant rheological profile of an oil-based drilling fluid over a temperature range of about 120° F. to about 40° F., comprising adding drilling fluid additive to the drilling fluid, wherein the drilling fluid additive comprises an organoclay composition comprising:

a phyllosilicate clay; and a mixture of quaternary ammonium ions, each ion having a formula of $[N-R^1R^2R^3R^4]^+$ wherein one or more of $R^1$, $R^2$ and $R^3$ is each a mixture of branched alkyl groups, each branched alkyl group having 12 to 22 total carbon atoms, a linear backbone and one or more $C_1$ to $C_3$ branching alkyl groups each being linked to the linear backbone, wherein within each quaternary ammonium ion and within the mixture of branched alkyl groups, the branching alkyl groups are linked to the linear backbones at different carbon positions along the linear backbones as a distribution; and wherein when one or more of $R^2$ and $R^3$ is not a branched alkyl group, $R^2$ and $R^3$ are a first linear alkyl group having 1 to 22 carbon atoms, wherein $R^4$ is selected from the group consisting of a second linear alkyl group having 1 to 6 carbon atoms, an aryl group and combinations thereof.

2. The method according to claim 1, wherein $R^1$ is a mixture of branched alkyl groups.

3. The method according to claim 1, wherein $R^1$ and $R^2$ are each a mixture of branched alkyl groups.

4. The method according to claim 1, wherein $R^1$, $R^2$ and $R^3$ are each a mixture of branched alkyl groups.

5. The method according to claim 1, wherein one or more of $R^2$ and $R^3$ are each a linear alkyl group having 1 to 22 total carbon atoms.

6. The method according to claim 5, wherein one or more of $R^2$ and $R^3$ are each a linear alkyl group having 12 to 22 total carbon atoms.

7. The method according to claim 5, wherein one or more of $R^2$ and $R^3$ are each a linear alkyl group having 1 to 6 total carbon atoms.

8. The method according to claim 1, wherein $R^4$ is independently selected from the group consisting of a benzyl group, a methyl group, an ethyl group, a propyl group, a butyl group, a pentyl group or a hexyl group.

9. The method according to claim 1, wherein one of $R^2$, $R^3$ and $R^4$ is methyl.

10. The method according to claim 1, wherein $R^2$ and $R^3$ are methyl and $R^4$ is benzyl.

11. The method according to claim 1, wherein each branched alkyl group has a distribution of branching points distributed along the linear backbone of the branched alkyl group ranging from a 2 carbon atom position on the linear backbone, counting from a 1 carbon atom position which is bonded to $N^+$, to a $\omega$-2 carbon atom position, where $\omega$ is a terminal carbon atom position on the linear backbone.

12. The method according to claim 1, wherein each branched alkyl group has 12 to 18 carbon atoms.

13. The method according to claim 1, wherein each branched alkyl group has 14 to 18 carbon atoms.

14. The method according to claim 1, wherein the linear backbone contains less 0.5 atom % of quaternary carbon atoms.

15. The method according to claim 1, wherein the linear backbone is substantially free of quaternary carbon atoms.

16. The method according to claim 1, wherein a methyl branch is at least 50% of the branching alkyl groups based on the total number of branches.

17. The method according to claim 1, wherein the phyllosilicate clay comprises a smectite clay.

18. The method of claim 17, wherein said smectite clay is selected from the group consisting of: montmorillonite, bentonite, hectorite, saponite, stevensite and beidellite.

19. The method of claim 17, wherein said smectite clay is selected from bentonite and hectorite, and mixtures thereof.

20. The method of claim 1, wherein having sufficient quaternary ammonium ions to satisfy 50 to 150 percent of phyllosilicate cation exchange capacity.

* * * * *